US012277210B2

(12) United States Patent
Sheriff et al.

(10) Patent No.: US 12,277,210 B2
(45) Date of Patent: *Apr. 15, 2025

(54) RUNTIME SECURITY ANALYTICS FOR SERVERLESS WORKLOADS

(71) Applicant: Cisco Technology, Inc., San Jose, CA (US)

(72) Inventors: Akram Sheriff, Newark, CA (US); Timothy David Keanini, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,149

(22) Filed: Sep. 29, 2023

(65) Prior Publication Data

US 2024/0028704 A1 Jan. 25, 2024

Related U.S. Application Data

(63) Continuation of application No. 17/077,592, filed on Oct. 22, 2020, now Pat. No. 11,809,548.

(51) Int. Cl.
*G06F 21/52* (2013.01)
*G06F 21/56* (2013.01)
*G06N 20/00* (2019.01)

(52) U.S. Cl.
CPC ............ *G06F 21/52* (2013.01); *G06F 21/566* (2013.01); *G06N 20/00* (2019.01); *G06F 2221/033* (2013.01)

(58) Field of Classification Search
CPC ....................................................... G06F 21/52
See application file for complete search history.

(56) References Cited

U.S. PATENT DOCUMENTS

| | | | |
|---|---|---|---|
| 10,601,876 B1 | 3/2020 | Levy | |
| 11,044,173 B1 * | 6/2021 | Mestery | ............... H04L 41/0897 |
| 11,494,184 B1 | 11/2022 | Dunham et al. | |
| 11,513,833 B1 | 11/2022 | Dunham et al. | |
| 2016/0014012 A1 | 1/2016 | Pruss et al. | |
| 2018/0276372 A1 | 9/2018 | Crabtree et al. | |
| 2019/0220601 A1 | 7/2019 | Sood et al. | |

(Continued)

OTHER PUBLICATIONS

Office Action for U.S. Appl. No. 17/077,592, mailed on Dec. 23, 2022, Akram Ismail Sheriff, "Runtime Security Analytics for Serverless Workloads", 8 pages.

*Primary Examiner* — Simon P Kanaan
(74) *Attorney, Agent, or Firm* — Lee & Hayes, P.C.

(57) ABSTRACT

Runtime security threats are detected and analyzed for serverless functions developed for hybrid clouds or other cloud-based deployment environments. One or more serverless functions may be received and executed within a container instance executing in a controlled and monitored environment. The execution of the serverless functions is monitored, using a monitoring layer in the controlled environment to capture runtime data including container application context statistics, serverless function input and output data, and runtime parameter snapshots of the serverless functions. Execution data associated with the serverless functions may be analyzed and provided to various supervised and/or unsupervised machine-learning models configured to detect and analyze runtime security threats.

20 Claims, 7 Drawing Sheets

(56) References Cited

U.S. PATENT DOCUMENTS

| | | |
|---|---|---|
| 2019/0312899 A1 | 10/2019 | Shulman et al. |
| 2019/0384655 A1* | 12/2019 | Krishna Singuru .... G06F 9/542 |
| 2020/0202997 A1* | 6/2020 | Hadad .................... G16H 50/70 |
| 2020/0267155 A1 | 8/2020 | Segal et al. |
| 2021/0263779 A1 | 8/2021 | Haghighat et al. |
| 2021/0329003 A1 | 10/2021 | Segal et al. |
| 2022/0129540 A1 | 4/2022 | Sheriff et al. |

\* cited by examiner

302 — CONTAINER APPLICATION RUNTIME DATA

| TIMESTAMP (MS) | CONTAINER ID | ACCESS TYPE | ADDRESS | ACCESSED DATA SIZE | ACCESS LEVEL |
|---|---|---|---|---|---|
| 1503293862000 | 340e0a2d67aa | Write | 83099648 | 524288 | BLK |
| 1503293863000 | 340e0a2d67aa | Write | 83100672 | 524288 | BLK |
| ... | ... | ... | ... | ... | ... |

FIG. 3A

304 — SERVERLESS FUNCTION RUNTIME I/O DATA

| FUNCTION ID | INVOCATION TIMESTAMP | INVOKED BY | INPUT FEATURES | COMPLETION TIMESTAMP | OUTPUT DATA |
|---|---|---|---|---|---|
| Function ABC | 1503293864000 | HTTP | Input Vals | 1503293864057 | Output Data |
| Function DEF | 1503293864015 | Function ABC | Input Vals | 1503293864027 | Output Data |
| ... | ... | ... | ... | ... | ... |

FIG. 3B

306 — SERVERLESS FUNCTION RUNTIME PARAMETER SNAPSHOT

| PARAMETER | TYPE |
|---|---|
| # of Context Switches | Integer |
| CPU Time Waiting for I/O Completions | Time (ms) |
| CPU Time Serving Software Interrupts | Time (ms) |
| Disk Sector Reads Count | Integer |
| # of Completed Disk Reads Count | Integer |
| Time Duration Spent Reading from Disk | Time (ms) |
| Disk Sector Writes Count for every FaaS Instantiation and Executed | Integer |
| # of Completed Disk Sector Writes Count | Integer |
| Time Duration Spent Writing to Disk (ms) | Time (ms) |
| # of Total Network Bytes Sent Count | Integer |
| # of Total Network Bytes Received Count | Integer |
| Average # of Processes in Last Min Count | Float |
| % of Memory Currently Used for FaaS Execution | Float |

FIG. 3C

RUNTIME SECURITY ANALYTICS FOR SERVERLESS WORKLOADS

CROSS-REFERENCE TO RELATED APPLICATIONS

This application is a continuation of and claims priority to U.S. patent application Ser. No. 17/077,592, filed Oct. 22, 2020, and entitled "Runtime Security Analytics For Serverless Workloads," the disclosure of which is hereby incorporated by reference in its entirety for all purposes.

TECHNICAL FIELD

The present disclosure generally relates to computer security and detection of malicious or harmful software. In particular, the present disclosure relates to executing serverless workloads in a controlled and monitored execution environment, and analyzing data captured during execution to detect runtime security threats associated with serverless functions.

BACKGROUND

Cloud computing solutions provide physical and virtual computer system resources, such as storage, computing power, network resources, and software, in the "cloud", and offers customers ways to remotely utilize the resources. In such solutions, cloud providers may manage the computing infrastructure, resources, and applications, allowing cloud clients (e.g., customers or tenants) to develop, deploy, and utilize applications within the cloud. For example, in serverless computing and/or function-as-a-service (FaaS) solutions, the cloud provider provides a computing execution model, and hosts and manages the underlying infrastructure, allowing developers to build and deploy applications without the responsibilities of infrastructure management and resource allocation. In serverless computing and/or FaaS models, clients may develop and upload code functions to the cloud, which manages the resources for running the functions. The cloud executes serverless functions in response to events configured to trigger particular functions, and thus serverless computing and FaaS models may simplify application development and deployment for clients. However, in serverless computing and FaaS frameworks also reduce client visibility and control capabilities.

Many effective techniques for detecting of malware and other security threats within software applications, as well as other detailed software analyses, require executing the software and observing the software during runtime. In this context, a "sandbox" refers to an isolated computing environment including a tightly controlled set of resources in which applications can be executed and analyzed for potential security threats. Traditional sandbox products emulate traditional computing environments, such as using virtual machines to emulate host servers or desktop environments with predetermined operating systems, network and software resources.

However, for software executing in serverless computing and/or FaaS environments, traditional sandbox products are not applicable because there is no traditional computing environment that can be mimicked. Thus, traditional sandbox products are unable to provide sandbox capabilities for serverless and FaaS environments, both with respect to creating secure and isolated serverless environments within which the serverless applications can be run, and also in observing the applications during execution at a low-level with sufficient granularity to identify runtime security threats.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 3A-3C are tables illustrating examples of runtime data captured in association with serverless functions executed within a container application environment, in accordance one or more techniques described herein.

DESCRIPTION OF EXAMPLE EMBODIMENTS

Overview

Figure 1:
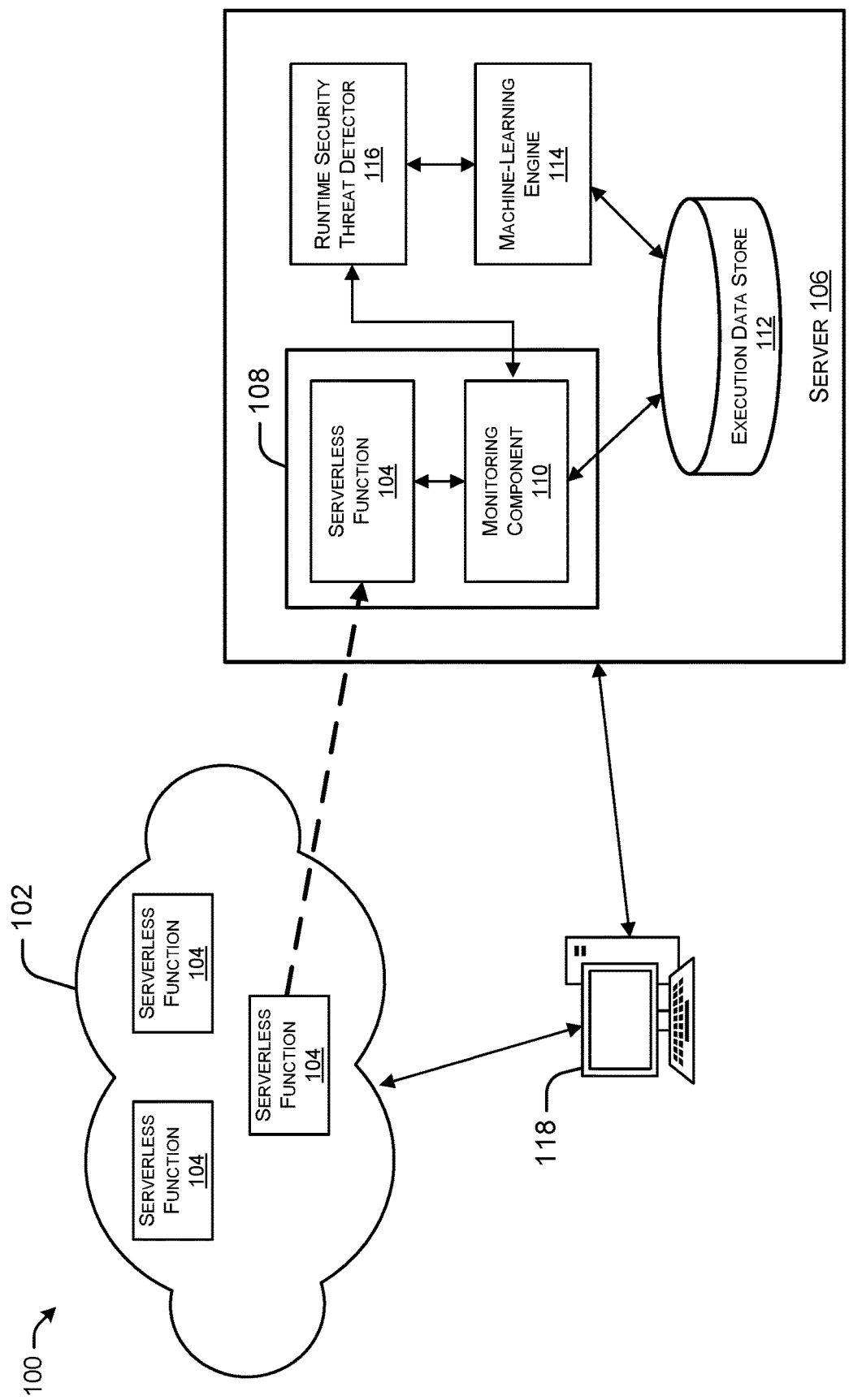
FIG. 1 illustrates a computing environment including a cloud-based serverless deployment environment and a server configured to receive, execute, and monitor serverless functions, in accordance one or more techniques described herein.

This disclosure describes techniques for detecting runtime security threats within serverless functions developed and deployed for execution in hybrid clouds and other cloud-based deployment environments. As described in various examples herein, a serverless function, or a set of related serverless functions, may be exported to a controlled environment, and monitored during execution to collect various runtime/execution data. For instance, a server may provide a container-based application environment running one or more container instances to receive and execute serverless functions. During the execution of the serverless functions within container instances, the server may capture runtime data associated with the serverless functions. The runtime data for serverless functions may be provided to machine-learning models configured to perform supervised and/or unsupervised learning techniques to detect runtime security threats associated with the serverless functions.

A "serverless function" may refer to a software function developed for deployment within and management by a cloud computing environment. As used herein, serverless functions may include functions based on any and all technologies implementing serverless software applications and function-as-a-service (FaaS) services, and the techniques described herein may be applied to various type of serverless functions, including but not limited to microservices, serverless applications, cloud functions, FaaS services, etc. Further, it should be understood that the techniques described herein are agnostic with respect to cloud service providers, and may be used to execute and detect runtime security threats in serverless functions regardless of any intended cloud deployment environment.

In some examples, a computer system may provide a controlled and isolated environment in which to execute and monitor serverless functions. For instance, a server may execute a container-based secure application environment in which one or more container instances are used to run individual serverless functions or sets of related serverless functions. In such examples, the server may select and import a serverless function from a deployment environment (e.g., a hybrid cloud environment) for execution within a secure local container instance. The computer server also may emulate a similar or identical cloud-based execution environment from which the serverless function was imported, including application programming interfaces (APIs), software libraries, and invocation contexts of the serverless function. In some examples, the computer server also may import and execute multiple serverless functions within the same container instance, such as a set of dependent or chained serverless functions configured to perform related or complementary operations.

After receiving one or more serverless functions from a deployment environment, the computer server may execute and monitor the serverless functions in a controlled and isolated environment to detect runtime security threats associated with the serverless functions. As noted above, in some examples the serverless functions may be executed with a container application instance configured to emulate the cloud-based execution environment of the serverless functions. A monitoring component running within the container instance, or elsewhere on the computer server, may capture and track various execution data such as function calls, execution times, and/or other runtime parameters associated with the serverless functions. In various examples the monitoring component may capture different types and combinations of execution data, including but not limited to the inputs and outputs of all serverless function calls, execution time data, memory usage, and/or container runtime statistics. The monitoring component also may capture snapshots of various runtime parameters for the serverless functions, including CPU usage data, memory read/write data, network transmission data, and the like, at periodic intervals during execution. In some cases, the monitoring component may include a network service mesh configured to monitor interprocess communications (e.g., at network layer 2 and/or layer 3) between the serverless functions executing within the controlled environment.

After executed the serverless function(s) within the monitored environment, the execution data captured by the monitoring component(s) may be analyzed to determine potential runtime security threats associated with the serverless functions. In some examples, the execution data captured for one or more serverless functions may be provided to machine-learning models trained to detect potential runtime security issues and/or output threat assessment scores for the serverless functions. Data collected by multiple container instances executing the same set of serverless functions may be used to train machine-learning models using supervised and/or unsupervised machine learning techniques and algorithms. In some cases, machine-learning models may be configured to analyze function invocation patterns, execution times, memory usage, etc., within the same serverless functions, and may identify potential security threats based on deviations between different monitored executions within the controlled environment. A machine-learning engine may create, train, test, and deploy models, which may use various machine learning techniques to distinguish between static and dynamic features within the execution data, and may apply weights to specific features to distinguish data patterns and trends associated with runtime security threats. In some examples, it may be difficult to use STRIDE threat modeling in hybrid cloud environments running serverless functions. Accordingly, as described in the examples herein, the runtime data for serverless functions may be provided to machine-learning models configured to perform supervised and/or unsupervised learning techniques to detect runtime security threats associated with the serverless functions.

As illustrated in the various examples herein, the techniques in this disclosure provide improvements in detection of runtime security threats for serverless functions, microservices, FaaS services, and similar technologies. For example, the techniques described herein include runtime monitoring of serverless functions in a controlled environment, which provides technical advantages over non runtime-based security analyses in which the analyzed software cannot be observed in operation. Additionally, the techniques herein include providing controlled environments in which multiple sets of dependent or chained serverless functions may be executed and monitored together in a container instance, which allows improved monitoring and analysis of the function execution patterns, timing, data and network usage, and the like for set of interacting serverless functions rather than analyzing individual functions running in isolation. Further, the additional techniques of capturing runtime parameter snapshots at periodic intervals during the execution of serverless functions, and monitoring interprocess communications at lower network levels, provide advantages of a more robust execution data set to analyze and model, allowing for the detection of previously undetectable trends and patterns within the serverless function execution data, and the identification of additional types of runtime security threats.

In an example of the present disclosure, a method includes receiving, by a computer system, a serverless function, and executing, by the computer system, the serverless function within a container-based application environment. The method in this example also includes capturing, by the computer system, first data associated with the execution of the serverless function, using a monitoring component executing within the container-based application environment, and comparing, by the computer system, the first data to second data associated with one or more previous executions of the serverless function. Additionally, the method includes detecting, by the computer system, a runtime security threat associated with the serverless function, based on comparing the first data to second data.

In another example of the present disclosure, a computer server includes one or more processors and one or more non-transitory computer-readable media storing instructions that, when executed by the one or more processors, cause the one or more processors to perform various operations. The operations in this example include receiving a data file including an executable serverless function, and invoking the executable serverless function within a container-based application environment. The operations further include capturing first data associated with the execution of the serverless function, using a monitoring component executing within the container-based application environment, and comparing the first data to second data associated with one or more previous executions of the serverless function. Additionally, the operations include determining a runtime security threat associated with the serverless function, based on comparing the first data to second data.

In yet another example of the present disclosure, a non-transitory computer-readable medium stores processor-executable instructions that, when executed by one or more processors, cause the one or more processors to perform various operations. In this example, the operations include receiving a serverless function, executing the serverless function within a container-based application environment, and capturing first data associated with the execution of the serverless function, using a monitoring component executing within the container-based application environment. The operations in this example also include comparing the first data to second data associated with one or more previous executions of the serverless function, and detecting a runtime security threat associated with the serverless function, based on comparing the first data to second data.

Additionally, the techniques described in this disclosure may be implemented and performed as systems, methods, and/or computer-program products tangibly embodied in a non-transitory computer-readable storage medium, etc.

Example Embodiments

This disclosure describes techniques for executing serverless functions in a controlled and monitored environment, and analyzing the execution data to detect runtime security threats associated with the serverless functions. As described below, a controlled environment may be provided to receive and execute a serverless function, or a set of related serverless functions. During execution of the serverless functions, various execution data is captured and monitored, including container application context statistics, serverless function input and output data, runtime parameter snapshots of the serverless functions, and the like. The execution data captured for the serverless functions may be analyzed using machine-learning models and related techniques to identify patterns, trends, and deviations in the execution data, which may be used to detect potential runtime security threats associated with the serverless functions.

FIG. 1 shows a computing environment 100 including a deployment environment 102 for serverless functions 104, and a computer server 106 configured to receive, execute, and monitor the serverless functions 104 associated. The deployment environment 102 may include a cloud-based computing environment, including one or more computer servers and/or datacenters operating in a cloud network configured to provide cloud services to client devices. In some examples, the environment 102 comprises a hybrid cloud computing environment, including one or more private clouds, one or more public clouds, and/or on-premise infrastructures. For instance, a hybrid cloud deployment environment 102 may include one set of software applications and data storage implemented using a private cloud and/or on-premise infrastructure for storing or processing private and secure data, along with additional applications and data storage implemented in a public cloud implementing a FaaS platform to provide flexibility, scalability, and cost saving for the implementation of serverless functions 104.

In some cases, serverless functions 104 may include a variety of discrete and single-purpose programmatic functions, developed by cloud clients to be deployed within the cloud-based deployment environment 102. It should be noted that the techniques described herein for executing and monitoring serverless functions 104 are not limited to any particular type or functionality of serverless function, but may be applied to execute, monitor, analyze, and detect potential runtime threats associated with any number of serverless functions. For instance, the serverless functions 104 described herein may include but are not limited to serverless website functions, serverless authentication functions, serverless user interface functions, serverless media communication, serverless notification functions, serverless Internet-of-Things (IoT) functions, etc. Further, as noted above the techniques described herein may apply to various different cloud providers and cloud deployment environments, and/or to various different serverless functions types and technologies (e.g., serverless applications, FaaS services, cloud functions, microservices, etc.).

As depicted in FIG. 1, a serverless function 104 may be copied from the deployment environment 102 to a separate computer server 106 configured to provide a controlled and isolated environment in which to execute serverless function 104. In some examples, when a serverless function 104 is selected to be executed and analyzed by the server 106, the server 106 may identify and import the executable components of the serverless function 104, along with one or more additional related serverless functions, events or other context data relating to the invocation of the serverless function 104, and/or the libraries and other software dependencies used by the serverless function 104. These various components may be identified, copied, and deployed within an isolated execution environment on the server 106, so that the serverless function 104 when executed on the server 106 will behave similarly or identically to the way the serverless function 104 behaves when executed in the cloud-based deployment environment 102.

The execution environment provided by the server 106 may include a container application instance 108 configured to execute the serverless function 104, and a monitoring component 110 configured to capture execution data (or runtime data) associated with the execution of the serverless function 104. As described below in more detail, the execution data captured or generated by the monitoring component 110 may be stored in one or more execution data stores 112, which may reside within the server 106 as shown in this example, or on storage devices external to the server 106. A machine-learning engine 114 may analyze the execution data collected by the monitoring component 110, including generating, training, and/or testing machine-learning models, and a runtime security threat detector 116 may invoke the machine-learning models to detect potential runtime security threats associated with the serverless function 104 executed on the server 106.

In this example, the container 108 may represent an instance of a container application configured to emulate an execution environment using virtual machines, guest operating systems, etc., and/or to execute the serverless function 104 along with its software dependencies. Although not separately depicted in this example, the server 106 may include components to retrieve and containerize the serverless function 104 and its related software and dependencies into a standalone executable software package. In some cases, the server 106 may execute multiple instances of a container application, where each instance performs a separate execution of the serverless function 104. Different container instances may implement different execution environments (e.g., OS versions, library versions, computing resource availability conditions, etc.), different user/execution permissions (e.g., security labels), and/or different invocation contexts (e.g., HTTP requests, input features and parameters, etc.). The execution data from the various containers 108 may be collected by one or more monitoring components 110 and stored in the execution data store 112, from where it may be analyzed and/or used to train machine-learned models.

A client device 118 may transmit the requests to control the servers and datacenters within the deployment environment 102, and the server 106 to perform the copying and security threat detection of a serverless function 104. For instance, in some implementations a set of serverless functions 104 may be developed and deployed within the environment 102, using a multi-stage product development cycle in which the serverless functions 104 are designed/planned, coded, built, tested, released, deployed, operated, and monitored, where these stages are performed cyclically for software versions, upgrades, bug-fixes, etc. Each stage of this example product development cycle for a serverless function 104 may be performed by software designers and developers via client device(s) 118, and each stage in the product development cycle may occur partially or entirely inside the deployment environment 102.

In this example, during a product development cycle for a serverless function 104 occurring within a deployment environment 102, at the release and/or deployment stages the serverless function 104 may be copied or exported from the environment 102 to the server 106 for a runtime security threat analysis. The exportation and security threat analysis of the serverless function by the server 106 may be initiated manually by a user request via client device 118, or automatically by the deployment environment 102 in response to detecting that the serverless function 104 is scheduled for release or deployment within the environment 102. For instance, prior to copying a serverless function 104 from a non-public development/testing environment to a publicly accessible production environment within the cloud-based deployment environment 102, a production management server within the deployment environment 102 may be configured to transmit a copy of the serverless function 104 to the server 106 for a runtime security threat analysis. After the server 106 completes the analysis, the results may be logged on the server 106, transmitted to the deployment environment 102, and/or provided to the client device 118 for review by a development team.

At different stages in the product development cycle, the deployment environment 102 may provide various open source and/or third-party software tools that can be accessed by developers via client devices 118 to assist with the development, testing, and deployment stages of the serverless function 104. In some examples, the server 106 may be retrieve the same open source and third-party software tools executing in the deployment environment 102 (e.g., configuration management tools, infrastructure automation tools, network monitoring tools, etc.), and may package/containerize and execute these tools within the same container instance 108 as the serverless function 104, to more accurately replicate the deployment environment 102.

Figure 2:
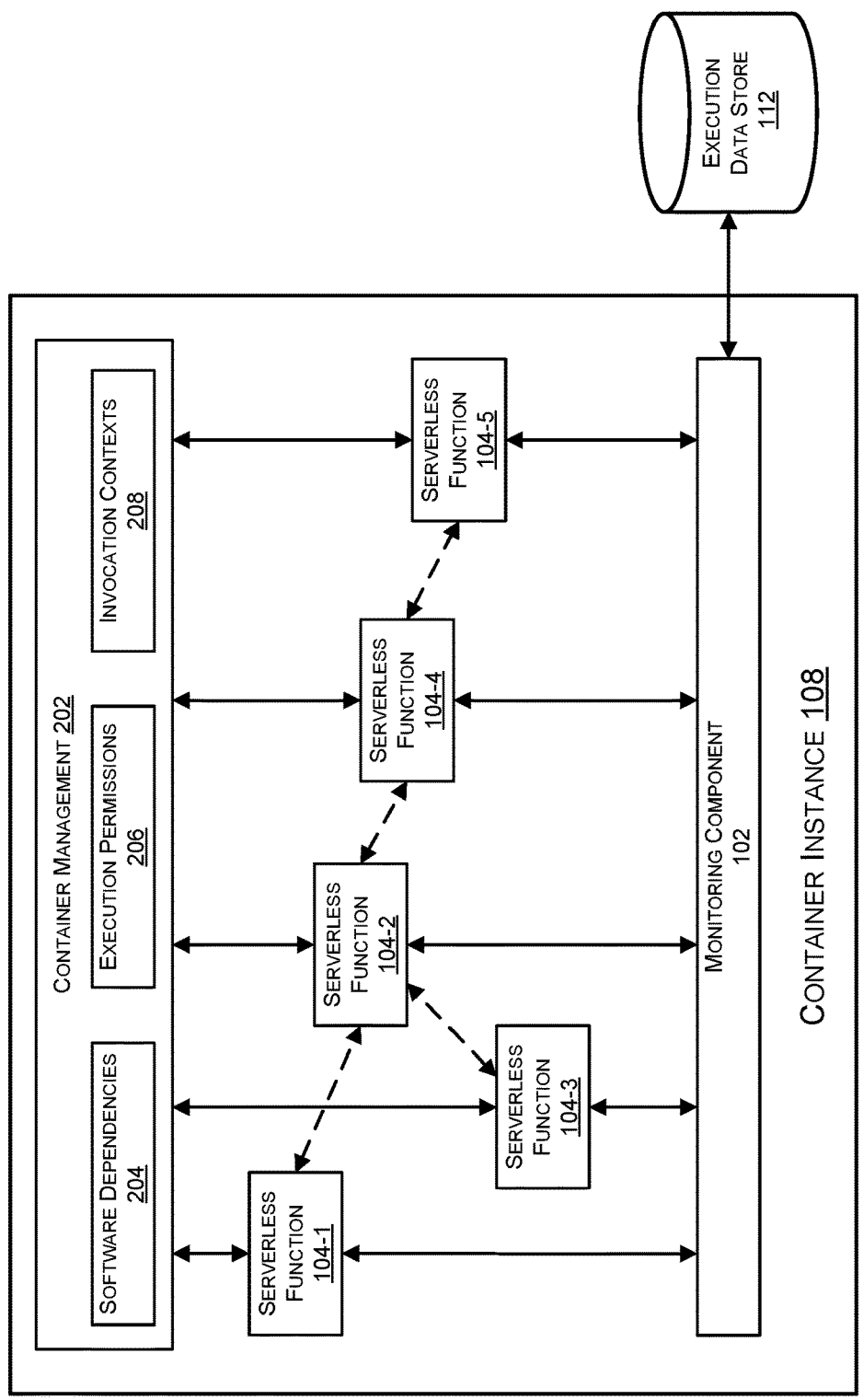
FIG. 2 illustrates an example software architecture including serverless functions executing within a container application, in accordance one or more techniques described herein.

FIG. 2 shows an example software architecture 200 providing a controlled and isolated environment for executing and monitoring serverless functions 104. As discussed above, the software architecture 200 may be implemented within a computer server 106 in some examples, and the serverless functions 104, container instance 108, monitoring component 110, and execution data store 112 each may be similar or identical to the corresponding components depicted in FIG. 1.

The example shown in FIG. 2 depicts the execution and monitoring of a serverless function 104-1 within a container instance 108. In this example, the serverless function 104-1 is programmed to invoke several dependent serverless functions 104-2 to 104-5 in a function execution chain. For instance, when executed under a certain invocation context, the serverless function 104-1 calls another serverless function 104-2, which calls two other serverless functions 104-3 and 104-4, etc. In such cases, the server 106 may use a number of possible techniques to discover any dependent serverless functions associated with the serverless function 104-1 to be analyzed. For instance, the server 106 may query a server in the deployment environment 102 for dependencies, analyze the serverless function 104-1, and/or receive the dependency data from a developer via a client device 118. Once determining any associated dependent functions, the server 106 may retrieve and package each of the related serverless functions 104-1 to 104-5, along with their respective libraries and other software dependencies, into an executable software component. The executable software component may be executed within the container instance 108 as illustrated.

During the execution of the serverless function 104-1 (and its dependent functions), the serverless function 104-1 may access a container management component 202 including the executable software dependencies (e.g., APIs and libraries) required by the serverless function 104-1, as well as the user/execution permission data 206 and the invocation context 208 associated with the current execution of the serverless function 104-1. In this example, the invocation context 208 may include data representing the conditions under which the serverless function 104-1 was invoked (e.g., events, requests, etc.), and the user permission data 206 may include data reflecting user credentials (e.g., security labels) associated with the function execution. For instance, the container instance 108 may simulate a scenario in which the serverless function 104-1 is executed based on a HTTP request from a particular user via an API gateway, in which case the container management component 202 may retrieve and provide the user's security label from the user permission data 206, and retrieve and simulate the attributes of the HTTP request from the invocation context 208 to invoke to the serverless function 104-1. In another example, the container instance 108 may simulate a different scenario in which the serverless function 104-1 is invoked by a different function, in which case the container management component 202 may retrieve and provide security label associated with the calling function. It should be understood that the security label (or other user credentials) within the user permission data 206 may affect the operation of the serverless function 104-1, in that it may control the ability of the serverless function 104-1 to send data to invoke other functions and/or send data to various output channels. In some instances, the serverless function 104-1 might be permitted to send data to a particular output channel only if the security label associated with the execution of the function is smaller than or equal to a particular channel label size, thereby reducing the possibility of excess re-entrant function calls.

As noted above, the container instance 108 encapsulates the application code of the serverless function 104-1 to be analyzed, along with the application code of any dependent serverless functions, software libraries, invoking events, etc. In this example, all inputs and outputs from each of the serverless functions 104-1 and 104-5 are redirected through the monitoring component 110, thereby allowing the monitoring component 110 to capture the input features, output data, and execution times associated with each serverless functions (and/or other software components) executing within the container instance 108. For instance, when the serverless function 104-1 is invoked within the container instance 108, the monitoring component 110 may capture the invocation time, request/event, input features/parameters, and the user credentials (e.g., security label) associated with the invocation. During the execution of the serverless function 104-1, it may invoke serverless function 104-2 one or more times, and for each invocation of serverless function 104-2 the monitoring component 110 may capture the invocation time and completion time, the input features/parameters and output data, the associated user credentials, etc. In this example, the monitoring component 110 may capture similar or identical data for each invocation of each of the serverless functions 104-1 to 104-5 executing within the container instance 108.

As discussed in more detail below, the execution data for this scenario and other multi-function scenarios (e.g., where multiple serverless functions are invoked one or more times in the container instance 108) may be stored and analyzed together as an associated execution scenario for the serverless function 104-1, rather than individually for each different serverless function. By capturing execution data from multiple dependent serverless functions executed as a chain based on the invocation of a top-level serverless function 104-1, the downstream analytics tools (e.g., machine-learning engine 114) may have more robust input data sets to allow for improved analysis and detection of runtime security threats.

As noted above, during the execution of serverless function(s) 104 within the container instance 108, the monitoring component 110 may detect and store data representing each function invocation and completion, including function entry and exit timestamps and the function inputs and outputs. In some examples, the monitoring component 110 includes a network service mesh to facilitate communications between serverless function(s) 104 and other software components (e.g., other serverless functions, libraries, etc.) within the container instance 108. In such examples, the network service mesh may be implemented as a connection-centric, rather than application-centric, service mesh configured to monitor interprocess communications to and from the serverless function(s) 104 at lower network layers (e.g., layer 2 and layer 3). When monitoring the network communications using a network service mesh, the monitoring component 110 may receive and analyze greater numbers of lower layer network connections, and therefore may collect more detailed data describing network connections data requested and transmitted, etc. As described below, the collection of additional monitoring data for serverless functions at the lower connection level, rather than at the higher application level (e.g., layer 7), allows for improved data analysis, machine-learning models, and security threat analysis and detection.

The monitoring component 110 also may capture additional types of execution data in various instances, including data associated with the execution of the container instance 108 itself. Such container execution data may include memory access data, execution times, CPU usage and other computer resource usage data for the container instance 108, during the execution of serverless function(s) 104. Additionally or alternatively, the monitoring component 110 may capture snapshots of predetermined runtime parameters at various times (e.g., periodic time intervals) during the execution of the serverless function(s). In conjunction with the other runtime data described herein, the runtime data for the container instance 108 and/or the serverless function parameter snapshot data also improves the analysis of the execution data, the resulting machine-learning models, and the overall capabilities of the system for detecting and analyzing runtime security threats associated with serverless functions.

FIGS. 3A-3C show three tables 302-306 illustrating examples of three different types of serverless function execution data that may be captured by the monitoring component 110 in various implementations. FIG. 3A depicts a first data table 302 including runtime (or execution) data collected for the container instance 108 during the execution of one or more serverless functions 104. In some implementations, the monitoring component 110 may observe and collect task control block (TCB) context statistics for the container instance 108, during the runtime duration of the serverless function(s) 104. As shown in this example, the TCB context statistics for the container instance 108 may include data representing the data accessed by the container instance 108 on the server 106 during runtime, including but not limited to timestamp data, a container instance identifier, a memory access type, a memory address, a size of the accessed data, and an access level for each memory access operation performed but the container instance 108 during runtime.

FIG. 3B depicts a second data table 304 including runtime input and output data associated with the serverless function(s) 104 executing within the container instance 108. As noted above, during execution of the serverless function(s) 104, the controlled environment (e.g., container instance 108) may be constructed so that all inputs and outputs from the serverless function(s) 104 are redirected through the monitoring component 110. Accordingly, in this example the monitoring component 110 may collect various input/output data during execution of the serverless function(s) 104, such as an identifier of the serverless function 104, a timestamp at which the serverless function was invoked, the type or cause of the invocation (e.g., an HTTP request or another function), a timestamp at which the serverless function was completed, and the data output by the serverless function 104.

FIG. 3C depicts a third data table 306 including a set of runtime parameters associated with the execution of the serverless function(s) 104 within the controlled environment on the server 106. Rather than providing examples data values as in tables 302 and 304, table 306 includes a description of each runtime parameter and an associated data type. As shown in this example, the runtime parameters captured during the execution of a serverless function 104 may include the number of context switches performed by the serverless function 104, the CPU time spent waiting for input/output completions, the CPU time spent serving software interrupts, the current number of disk sector reads, the number of completed disk sector reads, the time duration spent reading from the disk, the current number of disk sector writes, the number of completed disk sector writes, the time duration spent writing to the disk, the total number of network bytes sent, the total number of network bytes received, the average number of processes in the last min count, and the percentage of memory current used for the serverless function execution.

In this example, each of the runtime parameters shown in table 306 may be collected by the monitoring component 110, for each of the serverless functions 104 executed within the container instance (e.g., each of 104-1 to 104-5). Additionally, in some cases the monitoring component 110 may collect data values for the runtime parameters in table 306 multiple times during the execution of a serverless functions 104, for example, at periodic time intervals of 5 ms, 10 ms, 15 ms, 20 ms, etc. For instance, if a particular execution of a serverless function (e.g., 104-1) takes 45 ms to complete, then a monitoring component 110 configured to capture runtime parameters at 10 ms intervals may collect four separate sets of the runtime parameters during the particular execution of the serverless function. Additional sets of runtime parameters may be collected for any other serverless functions (e.g., 104-2 to 104-5) invoked within the same container instance 108 during the execution of the first serverless function. As noted above, in some examples the monitoring component 110 may use a network service mesh and/or other process/service monitoring techniques to capture runtime parameters during the execution of a serverless function 104.

Figure 4:
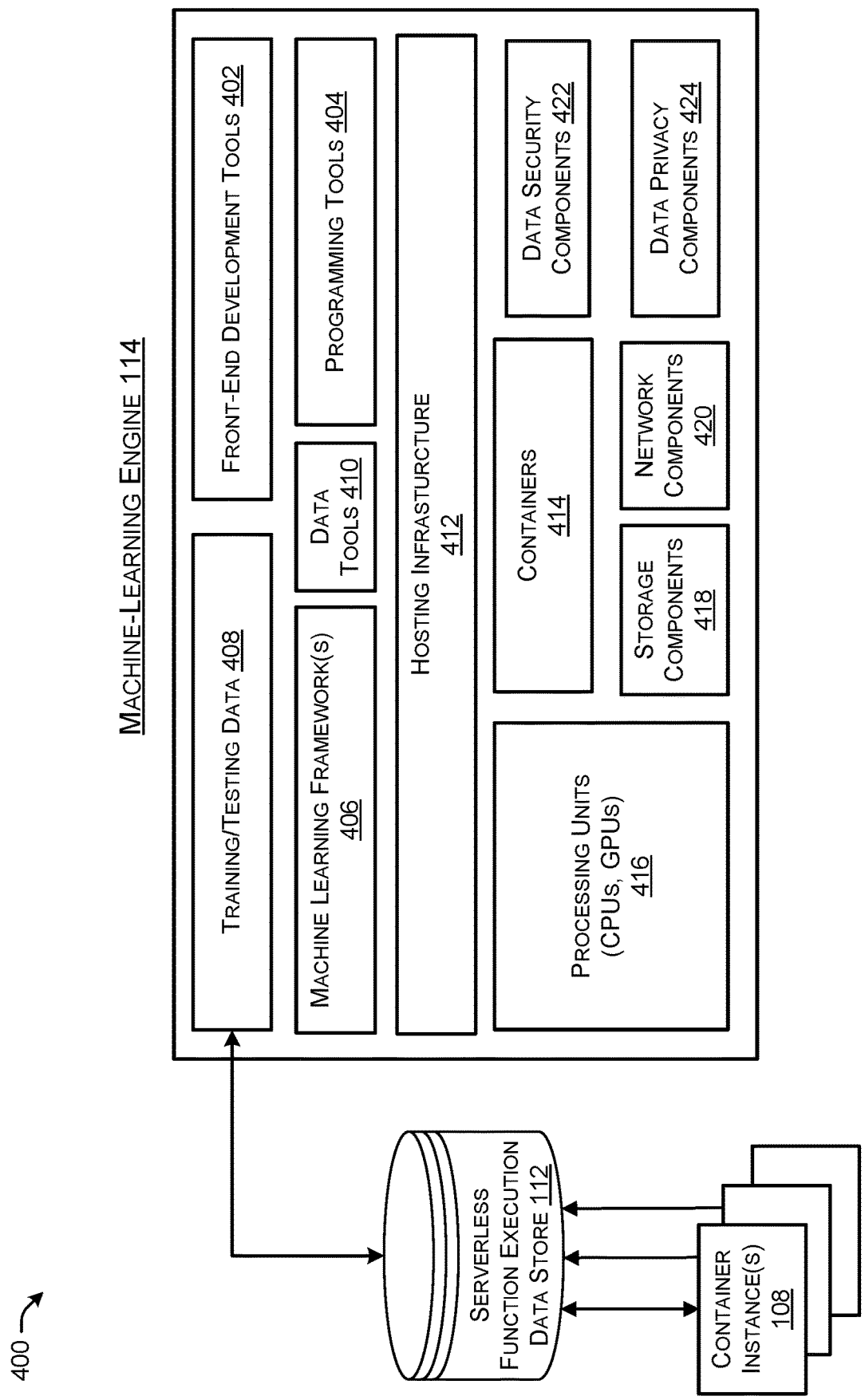
FIG. 4 illustrates an example machine-learning engine configured to train, evaluate, and execute machine-learning models, including models particularly trained to detect runtime security threats based on serverless function execution data, in accordance one or more techniques described herein.

FIG. 4 illustrates a system diagram 400 of an example machine-learning engine 114 configured to train, evaluate, and execute machine-learning models. As described above, the server 106 may provide a controlled environment in which to execute and observe serverless functions 104. As discussed above, the controlled environment in some cases may include a container instance 108, although other types of execution environments for serverless functions 104 may be used in other examples. Additionally, the monitoring data captured in association with the execution of the serverless functions 104 may be analyzed to detect runtime security threats. In some examples, the server 106 uses a machine-learning engine 114 to generate and train machine learning models based on the execution data collected by the monitoring component 110, and may execute the models to detect potential runtime security threats. The machine-learning engine 114 shown in this example may be configured particularly to generate and train models based on execution data for serverless functions 104, received from one or more container instances 108 (and/or monitoring components 110), including some or all of the execution data types described above in FIGS. 3A-3C. Additionally, although the examples below relate to using a machine-learning engine 114, it should be understood that other techniques (e.g., heuristics-based rules engines) may be used to analyze the execution data from serverless functions 104 and/or to detect or predict runtime security threats associated with the serverless functions 104.

The machine-learning engine 114 depicted in this example includes one or more front-end development tools 402. Development tools 402 may, for example, support machine-learning experiments, create a machine-learning solution architecture and/or a data architecture, as well as automating tasks such as integration, deployment, and monitoring of machine-learning models based on serverless function execution data. In some embodiments, the front-end development tools 402 may be web-based application tools that support creation and sharing documents containing live code, equations, visualizations and narrative text. Such tools may provide functionality for machine-learning development steps such as data cleaning and transformation, numerical simulation, statistical modeling, data visualization and testing/tuning machine learning models.

Programming tools 404 may correspond to the particular programming language(s) used for developing machine-learning applications. Languages such as PYTHON and JAVA may be advantageous for creating machine learning applications, including a rich toolset and support for fast iterative experimentation, as well as application speed in both production and development. Machine-learning framework 406 may include software building blocks for designing, training and validating machine-learning models based on serverless function execution data. The machine-learning framework 406 may include application programming interfaces (APIs) for the programming tools 404.

Training and testing data for the machine-learning models to be generated and trained may reside within the machine-learning engine 114 (e.g., training/testing data 408) and/or in one or more external data stores 112. Internal and external databases/data stores 408 and 112 may implement a data architecture applicable to the various execution data collected for serverless functions described herein. In some embodiments, the data may include sets of execution data associated with chains of related serverless function executions (e.g., 104-1 to 104-5), rather than storing separate execution data for each serverless function. Data stores 408 and 112 may include any combination of execution data types described above, from which training and testing data may be retrieved. The data stores 408 and 112 may support large quantities of training data, which may include structured data, unstructured data, metadata and semi-structured data received from multiple container instances 108 and/or multiple different servers 106 on which serverless functions 104 may be executed.

The data tools 410 implemented within the machine-learning engine 114 may include, for example, data visualization and viewer tools, data exploration tools, data filtering, transformation, and labelling tools, data anonymizer tools, data encryption/decryption tools, data search/analytics tools, and the like. Data tools 410 also may be used by the machine-learning engine 114 to prepare a data pipeline, and find datasets that may be used for machine-learning models and application. Such tools 410 may be visual and/or web browser-based (e.g., using Document Object Model (DOM) in some embodiments, or may be non-visual and non-web based which may save processing resources.

The hosting infrastructure 412 of the machine-learning engine 114 may include a platform capable of running the machine-learning models and application(s). The hosting infrastructure 412 may be used for development and training and machine-learning models, as well as production. In some embodiments, the hosting infrastructure 412 may include any or all of a physical housing and power supply, operating system (e.g., including backup services), network services, disaster recovery capabilities, operating services (e.g., deployment, administration, scheduling, and monitoring), and/or availability services. In some examples, the hosting infrastructure may leverage one or more commercial cloud platforms as an external cloud hosting infrastructure, while in other examples the hosting infrastructure 412 may be implemented internally within an on-premise data center. Additionally, the hosting infrastructure 412 may be configured to provide security and operating system updates automatically, without minimal or no application impact.

Containers 414 may be used within the hosting infrastructure 412 in some embodiments, to increase flexibility when developing and deploying machine-learning applications. Large clusters for machine-learning applications may be deployed on containers 414, leveraging the container technology to provide performance advantages and/or additionally flexibility. Containers 414 also may be used for development, hosting, integration, and testing.

Processing unit(s) 416 may include one or more central processing units (CPUs) and/or graphics processing units (GPUs). In some embodiments, GPUs may provide advantages over CPUs for the large-scale and intense number calculation operations that may be performed in machine-learning applications. Processing units 416 also may include tensor processing units (TPUs), which include artificial intelligence (AI) accelerator application-specific integrated circuits (ASICs) for supporting machine-learning applications.

Each of the various systems and subcomponents of the machine-learning engine 114 described above may use one or more underlying storage components 418 and network components 420. Additionally, in some embodiments, the machine-learning engine 114 may include one or more integrated data security components 422 and/or data privacy components 424. For example, security components 422 and/or privacy components 424 may include functionalities for training/testing machine-learning models on anonymized data sets, and/or using encryption on data to train/test machine-learning models.

In various examples, some or all of the components described above for the machine-learning engine 114 may be shared by the servers and/or datacenters on which the machine-learning engine 114 executes. For instance, as depicted in FIGS. 1-2, the machine-learning engine 114 may execute on the same server 106 that provides the monitored environment for executing the serverless functions 104. In other examples, the machine-learning engine 114 may be implemented as a separate computer system with dedicated resources.

Figure 5:
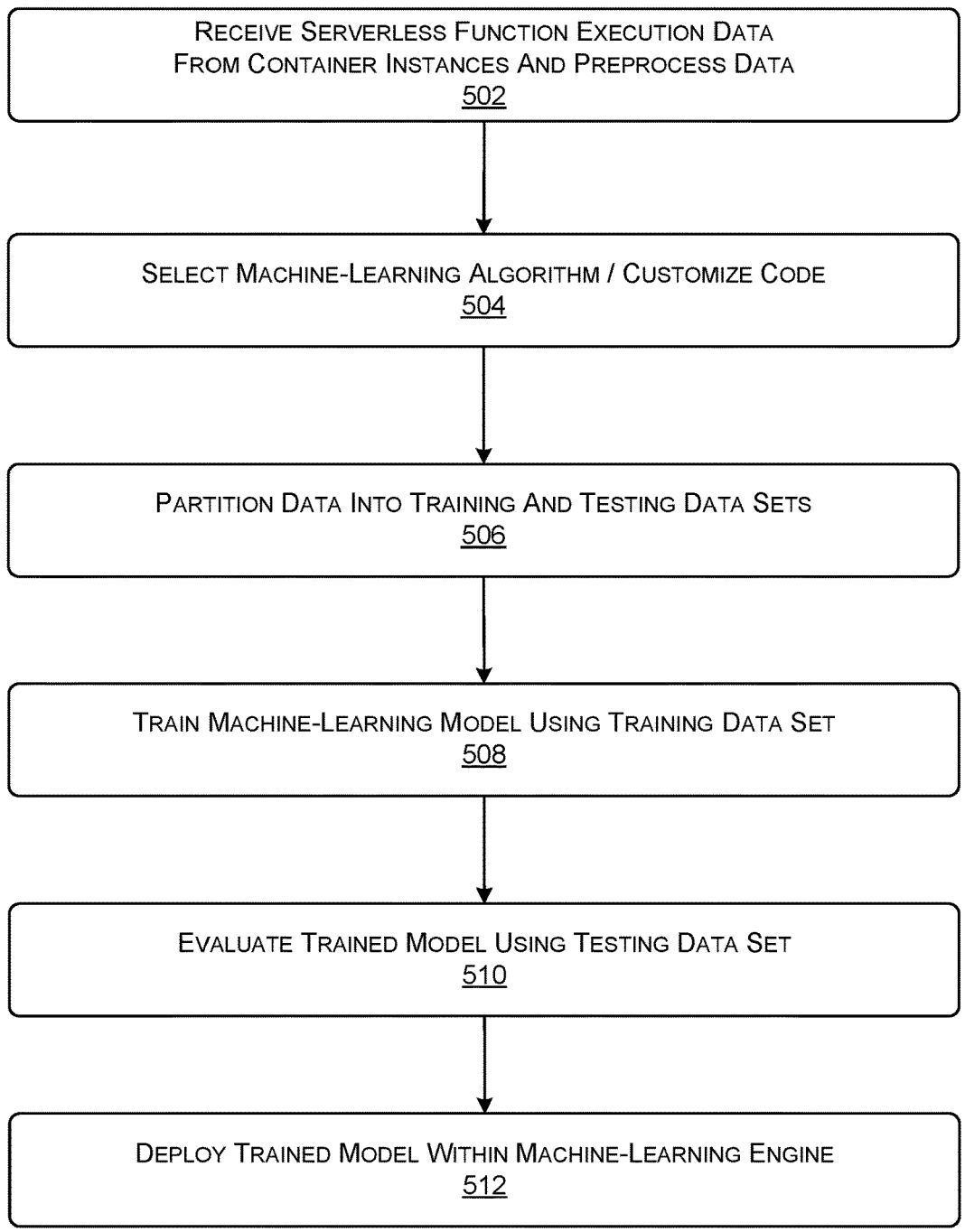
FIG. 5 illustrates an example process for training and evaluating a machine-learning model based on serverless function execution data, in accordance one or more techniques described herein.

FIG. 5 illustrates a flow diagram of an example process 500 for training and evaluating a machine-learning model based on execution data associated with one or more serverless functions 104, such as collected by monitoring components 110 within container instances 108 as described above. As described below, the operations of process 500 may be performed by a machine-learning engine 114, executing on a server 106 or in a separate computer system, based on serverless function execution data collected by monitoring components 110 and associated with one or more serverless functions 104. However, it should be understood that the operations described in reference to process 500 may be performed by any of the servers, computing devices, and/or components thereof that are described herein.

At operation 502, the machine-learning engine 114 may receive and preprocess data sets of serverless function execution data, based on the various execution data collected by monitoring components 110 associated with the executions of serverless functions 104 within controlled environments such as container instances 108. In some examples, one or more container instances 108 may execute and monitor a particular serverless function 104 multiple times (including any chained serverless functions and/or other software dependencies), under various different invocation contexts and with various different input features, parameters, and/or user permissions. For instance, the execution data received in operation 502 may be associated with a single top-level serverless function (e.g., 104-1), but may include execution data collected based on repeated executions of the top-level serverless function under multiple different invocation contexts. Additionally, the execution data received in operation 502 may include any combination of the various types of execution data described above in reference to FIGS. 1, 2, and 3A-3C, including runtime data associated with the container instance 108, runtime input/output data associated with the serverless function(s) 104, and/or one or more sets of runtime parameters collected periodically during the execution of the serverless function(s) 104 within the controlled environment.

At operation 504, the machine-learning engine 114 may select, generate, and/or customize the software code to implement one or more machine-learning algorithms to be used to train the machine-learning model. In various examples, the machine-learning algorithms selected at 504 may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

As noted above, the machine-learning engine 114 may use various supervised learning and/or unsupervised learning techniques in different examples. For instance, supervised learning techniques may be based on data correlations, regression analyses, and pattern matching with ground-truth data associated with existing known runtime security threats. Unsupervised learning techniques, in contrast, may analyze large amounts of serverless function execution data to detect patterns and trends in relevant execution data metrics (e.g., memory usage, reads/writes, execution times, CPU usage patterns, etc.), and may identify potential runtime security threats based on sufficient deviations (e.g., greater than a threshold) from predictions of one or more execution data metrics.

At operation 506, the machine-learning engine 114 may partition the execution data received at operation 502 into separate training and testing data sets, and at operation 508 the machine-learning engine 114 may generate the model and initiate the training process on the machine-learning model, using the training data set.

At operation 510, the trained machine-learning model may be evaluated, using one or more testing data sets, during which the trained model may be compared to an accuracy threshold for output predictions. In various embodiments the output predictions received from the trained model may correspond to threat assessment scores for the serverless function(s) 104 executed within the controlled environment, and/or predictions of a likelihood that the serverless functions 104 include or invoke malware or are otherwise associated with potential runtime security issues. In some examples, the data partitioning and/or the machine-learning model training and evaluation processes performed at operation 506-510 may repeat iteratively until the model is deemed to be sufficiently trained.

At operation 512, the trained model may be deployed within the machine-learning engine 114. As described above, the trained model may be accessed by one or more software components (e.g., a runtime security threat detector 116) to output a security score or other runtime threat assessment data for particular serverless function (or functions) 104 that have been executed and monitored on the server 106. In some cases, multiple different machine-learning models may be used for a single security score or runtime threat assessment, such as models based on different algorithms, models initially designed/configured differently, models providing different outputs, models trained with different training data sets, etc. In other examples, different machine-learning models may apply to different top-level serverless functions 104.

Figure 6:
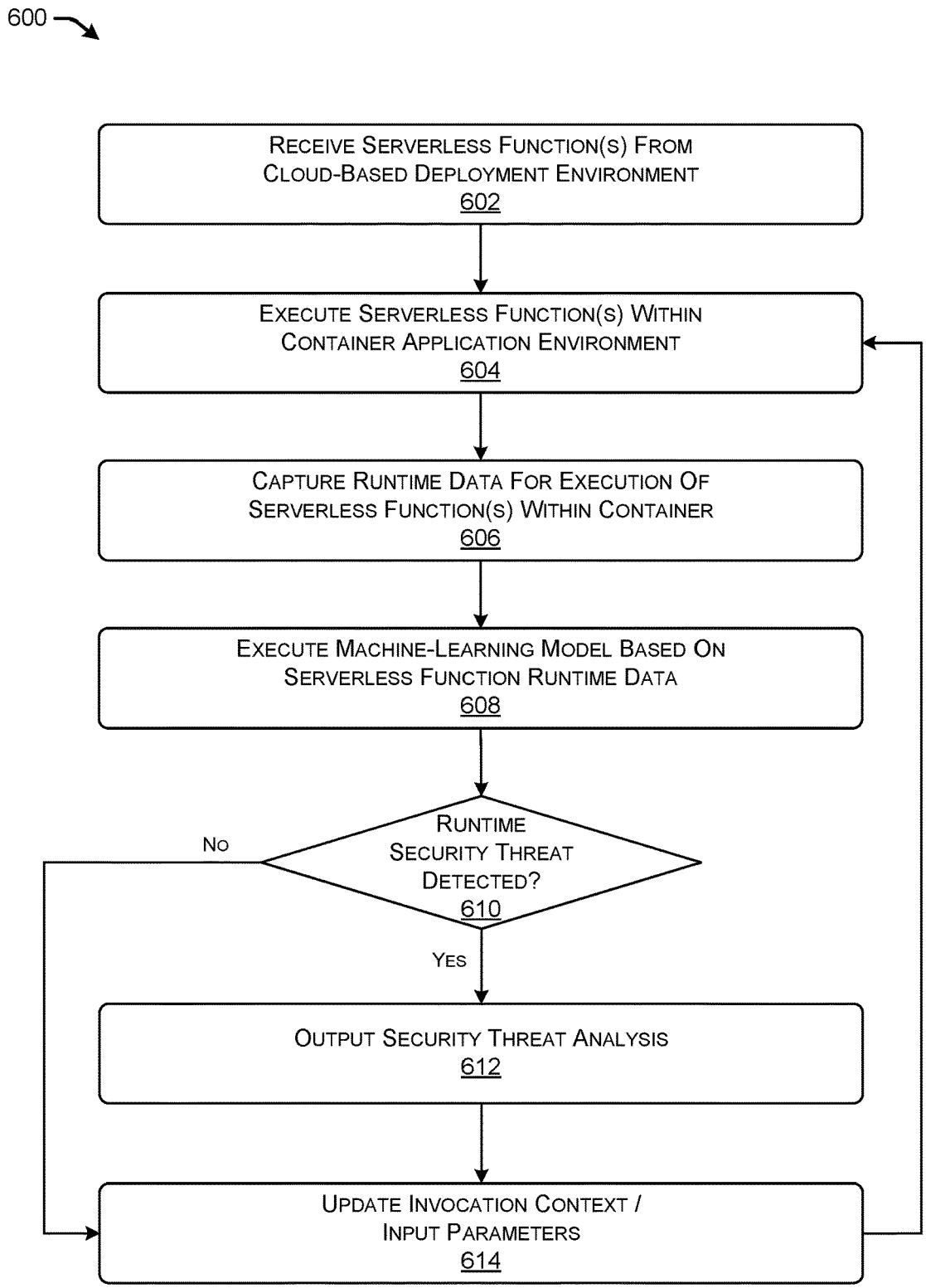
FIG. 6 illustrates an example process of executing a serverless function within a container application and detecting potential runtime security threats associated with the serverless function, in accordance with one or more techniques described herein.

FIG. 6 illustrates a flow diagram of an example process 600 executing a serverless function 104 within a monitored environment and analyzing execution data to detect potential runtime security threats associated with the serverless function. As described in various examples above, one or more computer servers may be configured provide monitored environments for executing and monitoring serverless functions 104, collecting execution data, and using machine-learning models and related techniques to analyze the execution data to detect potential runtime security threats. Accordingly, in the description below the process 600 may be performed by a server 106 executing one or more container instances 108 and/or monitoring components 110 configured to execute and monitor serverless function(s) 104 in a controlled environment. Additionally, an execution data store 112, machine-learning engine 114, and runtime security threat detector 116 may execute, on the same server 106 and/or a separate computer system, to store and analyze the execution data and determine potential runtime security threats associated with the serverless functions 104. However, it should be understood that the operations described in reference to process 600 need not be performed using an identical software architecture and identical data to that shown in FIGS. 1-4, but may performed by any configuration of servers, computing devices, and/or components consistent with the techniques described herein.

At operation 602, the server 106 may receive one or more serverless functions 104 from the cloud-based deployment environment 102. As described above, in some examples the serverless functions 104 received by the server 106 may be developed and configured for execution within a hybrid cloud environment including private or secure data storage and processing functions executing in a private cloud or on-premise computing infrastructure, while one or more serverless functions 104 are designed for execution in a public cloud of the deployment environment 102. In some cases, operation 602 may be initiated by a user (e.g., developer) via a client device 118, and/or may be triggered automatically as part of the testing, release, or deployment processes initiated within the deployment environment 102. As noted above, the server 106 may receive one particular serverless function 104 in an executable format in operation 602, based on a request to perform a runtime security threat analysis on the particular serverless function 104. Along with the particular serverless function 104 to be analyzed, the server 106 also may receive additional chained serverless function(s) 104, including other serverless functions 104 that invoke or are invoked by the particular serverless function 104 to be analyzed (e.g., 104-2 to 104-5). The server 106 also may receive one or more additional interfaces, software libraries, invocation contexts, user permissions, and/or any other software dependencies associated with the serverless function(s) to be analyzed.

At operation 604, the server 106 may execute the serverless function(s) 104 within a container application instance 108. As describe above, the container instance 108 may provide an isolated execution environment that will not affect the deployment environment 102 or any client devices or servers interacting with the deployment environment 102. During the execution of the serverless function(s) 104, the server 106 may use a monitoring component 110, which may execute inside or outside of the container instance 108, to capture and/or determine various runtime data base on the execution of the serverless function(s) 104. Within the container instance 108, the server 106 may execute a stand-alone executable software package that includes the serverless function(s) 104 and all software dependencies and tools within the deployment environment 102, along with a desired hardware and OS environment emulated via the container instance 108, including user permissions, invocation contexts, etc. Additionally, although a container instance 108 is described in this example, the server 106 may implement other types of execution environments in other examples, including virtual machine (VM) models, pod-based architectures, etc.

At operation 606, the server 106 may capture runtime data based on the execution of the serverless function(s) 104 in operation 604. The runtime data (or execution data) captured in operation 606 may include any combination of the various types of execution data described above, including runtime data associated with the container instance 108, runtime input/output data associated with the serverless function(s) 104, and/or one or more sets of runtime parameters collected periodically during the execution of the serverless function(s) 104. Additionally, the data collected in operation 606 may represent execution data not only for a particular serverless function 104 (e.g., 104-1) selected for a runtime security threat analysis, but also may include similar or identical data for any chained serverless functions 104 (e.g., 104-2 to 104-5) associated with the selected serverless function 104.

At operation 608, the server 106 executes one or more machine-learning models, using a machine-learning engine 114, based on the execution data captured in operation 606. As noted above, the machine-learning engine 114 and/or machine-learning models may execute on the same server 106 or on a separate computer system. To execute a machine-learning model, one or more components of the server 106 (e.g., runtime security threat detector 116) may retrieve and invoke one or more models associated with the serverless function(s) 104 executed, and may provide as input to the models some or all of the runtime data captured during the execution of the serverless function(s) 104 in the monitored environment. For instance, the input to a machine-learning model may include execution data correspond to a chain of related serverless function(s) 104-1 to 104-5, rather than just the execution data for a single serverless function 104. In various examples, the server 106 may initiate multiple machine-learning models in operation 608, wherein each may be based on different machine-learning algorithms or techniques, trained with different training data, etc. Further, although this example describes executing machine-learning models, in other examples the server 106 may additionally or alternatively execute other data analytics techniques in operation 608, such as statistical analytics and/or a heuristics rules-based analysis.

At operation 610, the server 106 may analyze the output of the machine-learning model(s) (or other data analysis techniques) executed in operation 608, to determine whether or not the serverless functions 104 are associated with potential runtime security threats. In some examples, the machine-learning models executed in operation 608 may output numeric runtime threat assessment scores, which the server 106 may receive and compare to a threshold to determine whether or not the serverless functions 104 are sufficiently likely to be runtime security threats. In other examples, the machine-learning models executed in operation 608 may output probability values and/or the identification of particular known malware types or other security threats that have a sufficiently similar execution data pattern to the input data provided to the model.

When the server 106 determines based on the execution data that the serverless functions 104 include one or more potential runtime security threats (610:Yes), then in operation 612 the server 106 outputs to threat analysis data to one or more external systems. For instance, the server 106 may generate runtime security threat reports and/or notifications to client devices 118 and/or servers with the deployment environment 102 in response to runtime security threat scores greater than a threshold. In contrast, when the server 106 determines that the execution data captured for the serverless functions 104 does not indicate a sufficient likelihood of a runtime security threat (610:No), then process 600 may proceed to operation 614.

In this example, at operation 614 the server 106 may update the invocation context and/or input parameters for the serverless functions 104, and return to operation 604 to perform an additional runtime security threat analysis. As noted above, certain runtime security threats may be exposed only for certain types of invocations (e.g., HTTP request or parent function invocation), only for input features or parameters, only for certain user permissions/security labels, etc. Accordingly, in this example the server 106 may perform a more detailed runtime security threat analysis by executing the selected serverless functions 104 multiple times within the monitored environment, using different invocation contexts and/or input parameters, and separately monitored and analyzing the results of each execution.

Figure 7:
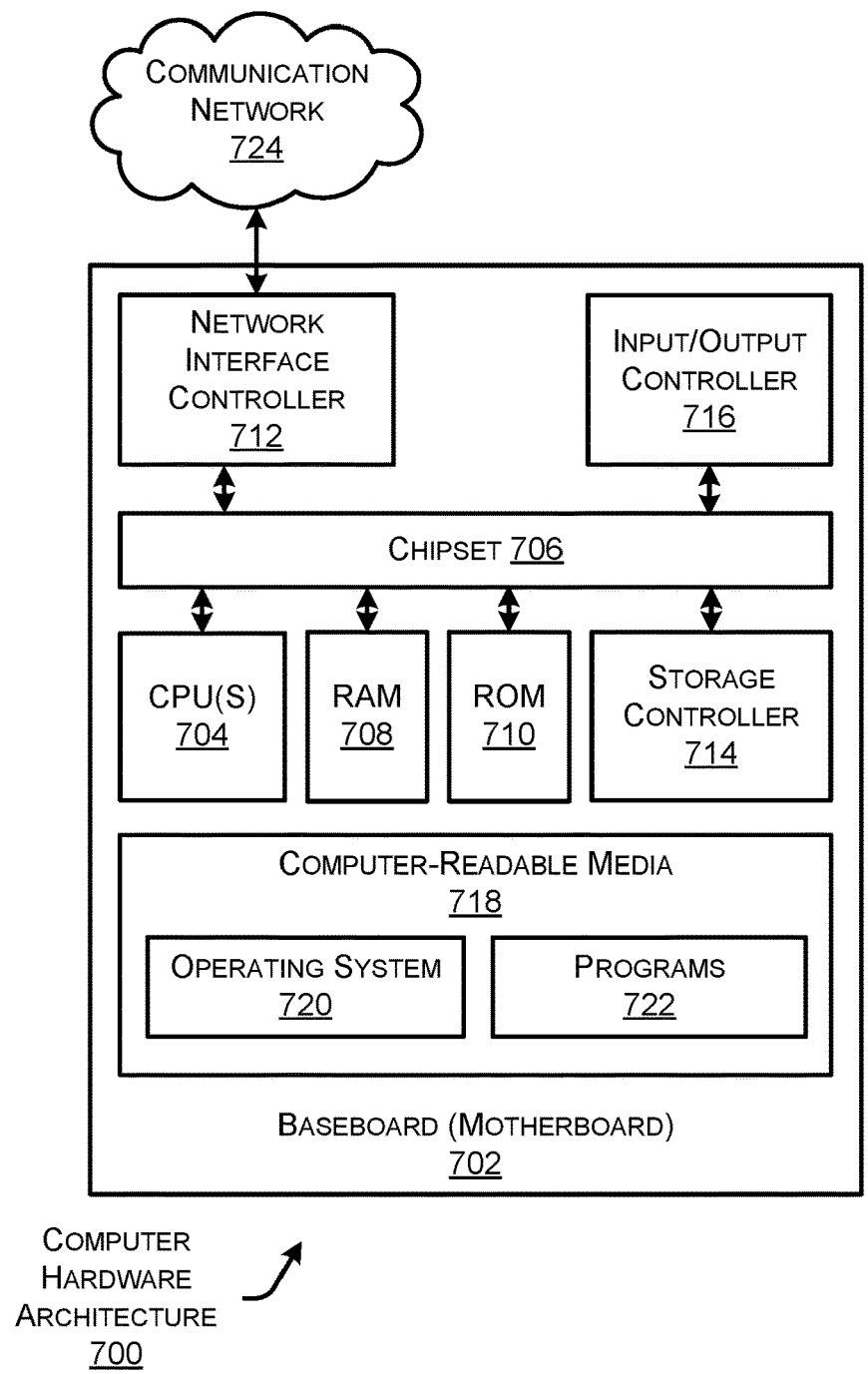
FIG. 7 illustrates a computer architecture diagram showing an example computer hardware architecture for implementing a computing device that can be utilized to implement aspects of the various technologies presented herein.

FIG. 7 illustrates a computer architecture diagram showing an example computer hardware architecture 700 for implementing a computer system (e.g., computing device, server, desktop, etc.) that can be utilized to implement aspects of the various technologies presented herein. For instance, the computer hardware architecture 700 shown in FIG. 7 may be used to implement one or more computer servers configured to execute and monitor serverless functions within a controlled environment, and analyze the execution data to identify potential runtime security threats associated with the serverless functions as described above. Therefore, in various implementations, the computer hardware architecture 700 may correspond to computer server 106, one or more servers within a deployment environment 102 executing serverless functions 104, and/or to various other computing devices configured to execute container application instances 108, machine-learning engines 114, runtime security threat detectors 116, and other components described herein. Additionally or alternatively, the computer hardware architecture 700 may be used to implement a client device 118 performing development and deployment tasks for serverless functions 104 within the deployment environment 102, and/or requesting a runtime security threat analysis of serverless functions 104 from the deployment environment 102, as described above. Computer hardware architecture 700 may correspond to one or more of a computer workstation, desktop computer, laptop, tablet, network appliance, e-reader, smartphone, or other computing device, and can be utilized to execute any combination of the software components presented herein. The computer 700 may, in some examples, correspond to a network device, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices can be connected by way of a system bus or other electrical communication paths. In one illustrative configuration, one or more central processing units (CPUs) 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through one or more communication networks 724, such as the computing environment 100. Communication network(s) 724 may include one or more wired or wireless communication networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. The chipset 706 can include functionality for providing network connectivity through a Network Interface Controller (NIC) 712, such as a gigabit Ethernet adapter. The NIC 712 is capable of connecting the computer 700 to other computing devices over the computing environment 100. It may be appreciated that multiple NICs 712 can be present in the computer 700, connecting the computer to other types of networks and remote computer systems. In some examples, the NIC 712 may be configured to perform at least some of the techniques described herein, such as packet redirects and/or other techniques described herein.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different examples of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the storage device 718 described above, the computer 700 can have access to other computer-readable storage media to store and retrieve information, such as program modules, data structures, or other data. It may be appreciated by those skilled in the art that computer-readable storage media is any available media that provides for the non-transitory storage of data and that can be accessed by the computer 700. In some examples, the operations performed by the computing environment 100 and/or any components included therein, may be supported by one or more devices similar to computer 700. Stated otherwise, some or all of the operations performed by the computing environment 100, and/or any components included therein, may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one example, the operating system 720 comprises the LINUX operating system. According to another example, the operating system comprises the WINDOWS® SERVER operating system from MICROSOFT Corporation of Redmond, Washington. According to further examples, the operating system can comprise the UNIX operating system or one of its variants. It may be appreciated that other operating systems can also be utilized. The storage device 718 can store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more of a client device 118, server(s) 106, or a network device (e.g., server computer, computing resource, router, etc.). The computer 700 may include one or more hardware processor(s) such as the CPUs 704 configured to execute one or more stored instructions. The CPUs 704 may comprise one or more cores. Further, the computer 700 may include one or more network interfaces configured to provide communications between the computer 700 and other devices, such as the communications described herein as being performed by the client device 118, a computer server 106, a system within a deployment environment 102, or a network device or other computing device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. For example, the network interfaces 412 may include devices compatible with the wired and/or wireless communication technologies and protocols described herein, including but not limited to Ethernet, Wi-Fi™ etc.

The programs 722 may comprise any type of programs or processes to perform the techniques described in this disclosure for providing controlled execution environments for serverless functions, monitoring serverless functions during execution, analyzing execution data using machine-learning models and other techniques, and identifying potential runtime security threats associated with the serverless functions. The programs 722 may enable computer servers 106 and/or client devices 118 to perform various operations described herein.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A method comprising:
    receiving a serverless function configured to execute in a deployment environment;
    executing the serverless function within a serverless environment isolated from the deployment environment;
    determining a value of an execution parameter during the execution of the serverless function, using a monitoring component executing within the serverless environment;
    determining a threshold for the execution parameter, wherein the threshold is associated with a runtime security threat; and
    determining, based at least in part in the value of the execution parameter and the threshold, that the serverless function is associated with the runtime security threat.

2. The method of claim 1, wherein the serverless environment comprises at least one:
    a container-based environment;
    a virtual machine model environment;
    a service mesh environment; or
    a pod-based architecture.

3. The method of claim 1, wherein the serverless environment is based on a hybrid cloud deployment model associated with the serverless function.

4. The method of claim 1, wherein executing the serverless function comprises emulating, within the serverless environment:
    a software library invoked during the execution of the serverless function;
    a user permission associated with the execution of the serverless function; and
    an invoking context associated with the execution of the serverless function.

5. The method of claim 1, further comprising:
    providing the value of the execution parameter as input to a machine-learned model trained based on data captured during a plurality of previous executions of the serverless function;
    receiving an output from the machine-learned model, wherein the output identifies a likelihood that the serverless function is associated with the runtime security threat; and
    comparing the output from the machine-learned model to the threshold.

6. The method of claim 1, wherein determining the value of the execution parameter includes determining at least one of:
    one or more input values provided to the serverless function;
    one or more output values generated by the serverless function; or
    one or more runtime parameters captured during the execution of the serverless function.

7. The method of claim 1, wherein determining the value of the execution parameter comprises:
    determining a first value for a runtime parameter associated with the serverless function, in response to determining that a first time interval has elapsed during the execution of the serverless function; and
    determining a second value for the runtime parameter, based on determining that a second time interval has elapsed during the execution of the serverless function, wherein the second time interval is greater than the first time interval.

8. The method of claim 1, further comprising:
    receiving a second serverless function, wherein the second serverless function is invoked by the execution of the serverless function; and
    executing the second serverless function within the serverless environment, concurrently with the execution of the serverless function,
    wherein the value of the execution parameter is determined based on data generated by the execution of the serverless function and data generated by the execution of the second serverless function.

9. The method of claim 1, wherein
    executing the serverless function comprises providing an input to the serverless function during execution, by a monitoring component of the serverless environment, and
    determining the value of the execution parameter comprises receiving an output from the monitoring component, during execution of the serverless function.

10. The method of claim 9, wherein the monitoring component of the serverless environment is configured to receive data from and provide data to the serverless function via at least one of network layer 2 or network layer 3.

11. The method of claim 1, wherein determining the value of the execution parameter comprises determining, based on executing the serverless function, at least one of:
    an execution time associated with the serverless function;
    a memory usage amount associated with the serverless function;
    a number of disk sector reads associated with the serverless function;
    a number of disk sector writes associated with the serverless function; or
    an network transmission amount associated with the serverless function.

12. The method of claim 1, wherein executing the serverless function comprises executing the serverless function within a container instance of the serverless environment, and
    wherein determining the value of the execution parameter comprises determining, based on executing the serverless function, at least one task control block (TCB) context statistic for the container instance.

13. A computer server comprising:
one or more processors; and
one or more non-transitory computer-readable media storing instructions that, when executed by the one or more processors, cause the one or more processors to perform operations comprising:
receiving a serverless function configured to execute in a deployment environment;
executing the serverless function within a serverless environment isolated from the deployment environment;
determining a value of an execution parameter during the execution of the serverless function, using a monitoring component executing within the serverless environment;
determining a threshold for the execution parameter, wherein the threshold is associated with a runtime security threat; and
determining, based at least in part in the value of the execution parameter and the threshold, that the serverless function is associated with the runtime security threat.

14. The computer server of claim 13, wherein the serverless environment comprises at least one:
a container-based environment;
a virtual machine model environment;
a service mesh environment; or
a pod-based architecture.

15. The computer server of claim 13, wherein executing the serverless function comprises emulating, within the serverless environment:
a software library invoked during the execution of the serverless function;
a user permission associated with the execution of the serverless function; and
an invoking context associated with the execution of the serverless function.

16. The computer server of claim 13, the operations further comprising:
providing the value of the execution parameter as input to a machine-learned model trained based on data captured during a plurality of previous executions of the serverless function;
receiving an output from the machine-learned model, wherein the output identifies a likelihood that the serverless function is associated with the runtime security threat; and
comparing the output from the machine-learned model to the threshold.

17. The computer server of claim 13, wherein determining the value of the execution parameter comprises:
determining a first value for a runtime parameter associated with the serverless function, in response to determining that a first time interval has elapsed during the execution of the serverless function; and
determining a second value for the runtime parameter, based on determining that a second time interval has elapsed during the execution of the serverless function, wherein the second time interval is greater than the first time interval.

18. One or more non-transitory computer-readable media storing processor-executable instructions that, when executed by one or more processors, cause the one or more processors to perform operations comprising:
receiving a serverless function configured to execute in a deployment environment;
executing the serverless function within a serverless environment isolated from the deployment environment;
determining a value of an execution parameter during the execution of the serverless function, using a monitoring component executing within the serverless environment;
determining a threshold for the execution parameter, wherein the threshold value is associated with a runtime security threat; and
determining, based at least in part in the value of the execution parameter and the threshold, that the serverless function is associated with the runtime security threat.

19. The one or more non-transitory computer-readable media of claim 18, wherein the serverless environment comprises at least one:
a container-based environment;
a virtual machine model environment;
a service mesh environment; or
a pod-based architecture.

20. The one or more non-transitory computer-readable media of claim 18, the operations further comprising:
providing the value of the execution parameter as input to a machine-learned model trained based on data captured during a plurality of previous executions of the serverless function;
receiving an output from the machine-learned model, wherein the output identifies a likelihood that the serverless function is associated with the runtime security threat; and
comparing the output from the machine-learned model to the threshold.

* * * * *